(No Model.)
J. ALBERTSON.
CORN AND CANE CUTTER.
No. 366,291. Patented July 12, 1887.
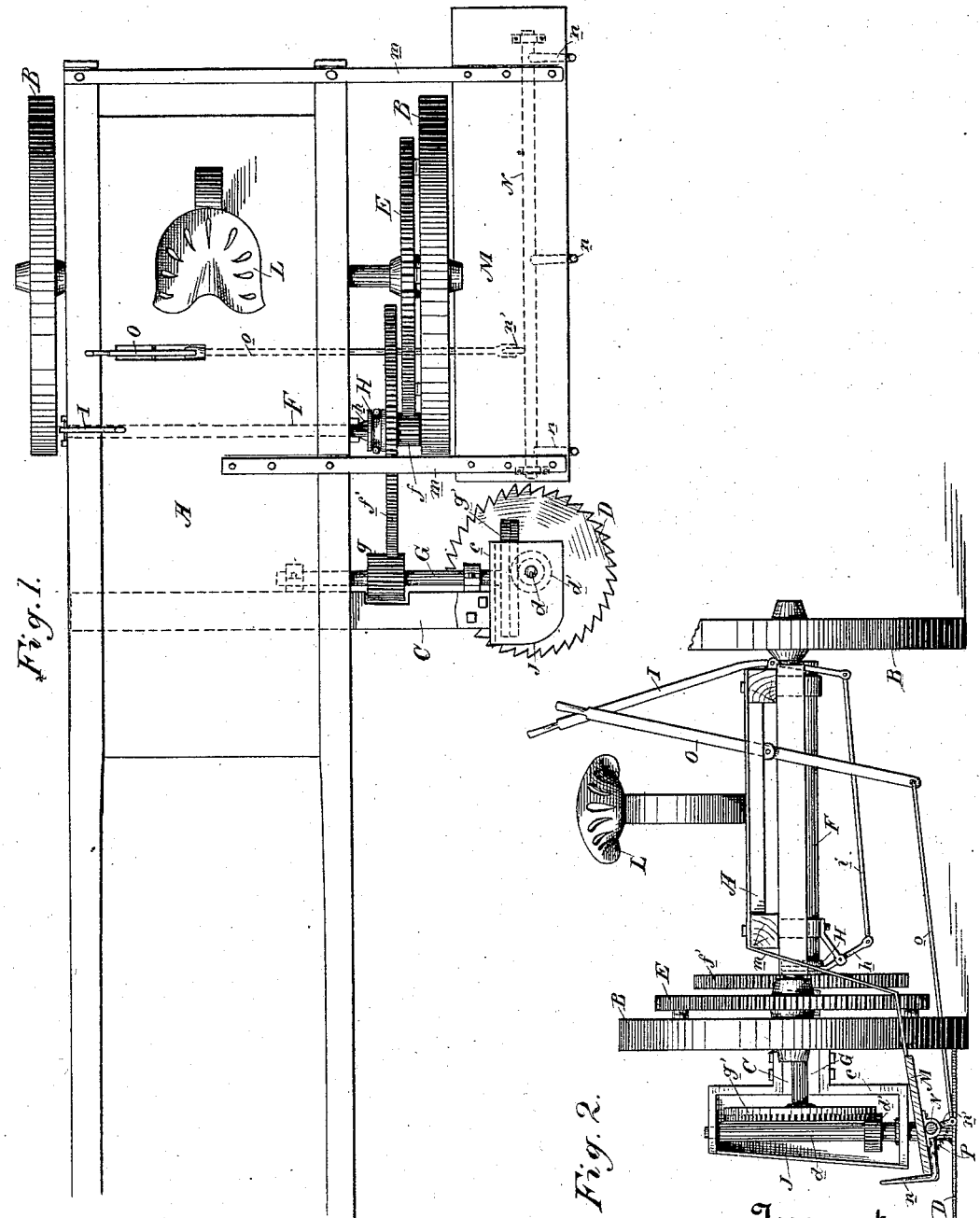

UNITED STATES PATENT OFFICE.

JOSEPH ALBERTSON, OF SAN FRANCISCO, CALIFORNIA.

CORN AND CANE CUTTER.

SPECIFICATION forming part of Letters Patent No. 366,291, dated July 12, 1887.

Application filed February 5, 1887. Serial No. 226,729. (No model.)

*To all whom it may concern:*

Be it known that I, JOSEPH ALBERTSON, of the city and county of San Francisco, State of California, have invented an Improvement in Corn and Cane Cutters; and I hereby declare the following to be a full, clear, and exact description of the same.

My invention relates to the class of agricultural machines for cutting standing corn, sugar-cane, &c.; and my invention consists in the construction and arrangement of parts, all of which I shall hereinafter fully describe.

The object of my invention is to provide a machine for cutting the standing stems of such vegetable growth as corn, sugar-cane, &c.

Referring to the accompanying drawings for a more complete explanation of my invention, Figure 1 is a plan of my machine. Fig. 2 is a rear elevation.

A is the frame of the machine, mounted on the wheels B. Across the front of the frame is secured a bar, C, to the outer end of which are attached brackets $c$—one above and one below—in which is mounted a vertical shaft, $d$, carrying on its lower end a cutter, D, which may be of any suitable character, though preferably a circular disk with teeth similar to a saw. This cutter, it will be seen, is located so that its periphery extends beyond or to one side of the vertical plane of the main wheel, in order that it may reach its work without interference from the wheel. Rotation is imparted to this cutter by the following mechanism: E is a gear on or rotated by the supporting-wheel B, which said gear meshes with a pinion, $f$, on a counter-shaft, F, which also carries a larger gear, $f'$, which meshes with a pinion, $g$, on a short shaft, G, which is mounted on the cross-bar C, and carries on its outer end a gear, $g'$, which meshes with a pinion, $d'$, on the vertical shaft $d$. In order to throw the cutter into or out of gear, I mount the pinion and gear $f f'$ on a feather or spline on the counter-shaft F, and provide the gear with a clutch-seat, H, which is engaged by a pivoted lever, $h$, operated by a pivoted lever, I, on the frame, and connected with the clutch-lever by a rod or link, $i$. By operating the lever I the clutch-lever moves the gear and pinion to or fro on the shaft, thereby throwing the pinion out of or into gear with the large gear E, the engagement of gear $f'$ with pinion $g$ being unaffected, as the pinion is made with wider teeth.

J is a case or guard which shields the mechanism driving the cutter.

L is a seat on the frame, which places the driver within reach of the several operating-levers.

M is a fixed platform mounted at an inclination and supported from the main frame by the hangers $m$. This platform is located outside of the main wheel B and just back of the cutter. Under the outer edge of the platform is a bar, N, provided with fingers or guards $n$, which project upwardly through or by the outer edge of the platform, and are adapted to have a vertical movement by means of a crank, $n'$, secured to the bar N, a pivoted lever, O, on the frame, and a rod or link, $o$, connecting said lever with the crank. A spring, P, holds the fingers normally in an upright position, so that they act as a guard-rail for the outer edge of the platform. By operating the lever O the fingers may be withdrawn, so as to completely free the platform and allow its load to dump, or by a reverse movement allow them to move back to their normal elevated position.

The operation of my machine is as follows: It is to be driven or drawn by suitable power, and it passes in such relation to the standing stems of the corn, sugar-cane, &c., that the cutter will come in contact therewith. The rotating cutter therefore serves to sever said stems at the height desired, and they fall over backward upon the platform, where, being kept by the upwardly-projecting fingers, they accumulate until it is desired to dump them, when, by operating the lever, the fingers are withdrawn and the load rolls off of the inclined platform.

Although I have here shown the rotating cutter and the platform upon but one side of the machine, it is obvious that I may place similar devices upon the other side of the machine, whereby, if necessary, I can cut two rows at one time.

Having thus described my invention, what I claim as new, and desire to secure by Letters Patent, is—

1. In a corn and cane cutting machine, the frame A, having the wheels B, with the gear E, in combination with the horizontal circular cutter D, its periphery extending beyond or to one side of the path of the supporting-wheel, the vertical shaft $d$, by which said cutter is carried, having the pinion $d'$, the short shaft G, having the gear $g'$ and the pinion $g$, the counter-shaft F, having the adjustable gear $f'$ and pinion $f$, and the clutch, clutch-lever, and connections for throwing the pinion into and out of gear with the gear E on the wheel, substantially as herein described.

2. A corn and cane cutting machine comprising the frame A, having the wheels B, and the cross-bar C, carried by the frame, and the brackets $c$ on the bar, the vertical shaft $d$ in the bracket, having on its lower end the circular horizontal cutter D to one side of the travel of the machine, and gearing by which the rotation of the wheel is imparted to the cutter, the shield or guard for protecting said gearing, the inclined platform, and the swinging fingers or guards in said platform, and the lever on the main frame, and connections for operating the fingers, all arranged and adapted to operate substantially as herein described.

In witness whereof I have hereunto set my hand.

JOSEPH ALBERTSON.

Witnesses:
   S. H. NOURSE,
   H. C. LEE.